US008782016B2

(12) United States Patent
Kaldas et al.

(10) Patent No.: US 8,782,016 B2
(45) Date of Patent: Jul. 15, 2014

(54) DATABASE RECORD REPAIR

(75) Inventors: Ihab Francis Ilyas Kaldas, Waterloo (CA); Mohamed Yakout, Doha (QA); Ahmed K. Elmagarmid, Doha (QA)

(73) Assignee: Qatar Foundation, Doha (QA)

( * ) Notice: Subject to any disclaimer, the term of this patent is extended or adjusted under 35 U.S.C. 154(b) by 120 days.

(21) Appl. No.: 13/218,789

(22) Filed: Aug. 26, 2011

(65) Prior Publication Data

US 2013/0054539 A1 Feb. 28, 2013

(51) Int. Cl.
*G06F 17/30* (2006.01)
*G06F 7/00* (2006.01)

(52) U.S. Cl.
USPC ............................ 707/691; 707/690; 707/692

(58) Field of Classification Search
None
See application file for complete search history.

(56) References Cited

U.S. PATENT DOCUMENTS

| | | | | |
|---|---|---|---|---|
| 5,504,890 | A * | 4/1996 | Sanford | 1/1 |
| 6,968,348 | B1 * | 11/2005 | Carone et al. | 707/696 |
| 7,092,956 | B2 * | 8/2006 | Ruediger | 707/602 |
| 7,562,067 | B2 * | 7/2009 | Chaudhuri et al. | 1/1 |
| 7,756,873 | B2 * | 7/2010 | Gould et al. | 707/737 |
| 8,041,668 | B2 * | 10/2011 | Fan et al. | 706/48 |
| 8,200,640 | B2 * | 6/2012 | Arasu et al. | 707/692 |
| 8,204,866 | B2 * | 6/2012 | Chaudhuri et al. | 707/692 |
| 8,346,736 | B2 * | 1/2013 | Haustein et al. | 707/692 |
| 8,356,017 | B2 * | 1/2013 | Akirav et al. | 707/692 |
| 8,639,667 | B2 * | 1/2014 | Golab et al. | 707/690 |
| 2004/0003005 | A1 * | 1/2004 | Chaudhuri et al. | 707/200 |
| 2004/0107386 | A1 * | 6/2004 | Burdick et al. | 714/38 |
| 2004/0181527 | A1 * | 9/2004 | Burdick et al. | 707/6 |
| 2005/0262044 | A1 * | 11/2005 | Chaudhuri et al. | 707/1 |
| 2006/0155743 | A1 * | 7/2006 | Bohannon et al. | 707/102 |
| 2007/0168334 | A1 * | 7/2007 | Julien et al. | 707/3 |
| 2008/0243967 | A1 * | 10/2008 | Bhatia et al. | 707/206 |
| 2008/0288482 | A1 * | 11/2008 | Chaudhuri et al. | 707/5 |
| 2008/0306945 | A1 * | 12/2008 | Chaudhuri et al. | 707/6 |
| 2009/0006302 | A1 * | 1/2009 | Fan et al. | 706/48 |
| 2010/0005048 | A1 * | 1/2010 | Bodapati et al. | 706/47 |
| 2010/0318499 | A1 * | 12/2010 | Arasu et al. | 707/693 |

FOREIGN PATENT DOCUMENTS

GB 2493963 A 2/2013
WO 2013029817 A1 3/2013

OTHER PUBLICATIONS

Lee et al. "Cleansing Data for Mining and Warehousing", 1999. In Proceedings of the 10th International Conference on Database and Expert Systems Applications (DEXA '99). Springer-Verlag, London, UK, pp. 751-760.*

Muller, H; et al, "Problems, Methods. and Challenges in Comprehensive Data Cleansing"; XP007920863 (2003; Retrieved from the Internet: URL:http://www.dbis.informatik.hu-berlin. dejfileadminjresearchjpapersjtechreportsj2003-hub ib 164-mueller. pdf [retrieved on Jul. 24, 2012].

(Continued)

*Primary Examiner* — Robert Beausoliel, Jr.
*Assistant Examiner* — Susan F Rayyan
(74) *Attorney, Agent, or Firm* — Mossman Kumar & Tyler PC

(57) ABSTRACT

A computer implemented method for repairing records of a database, comprises determining a first set of records of the database which violate a functional dependency of the database, modifying records in the first set to make them consistent with the functional dependency to provide an output consistent database instance, determining a second set of records of the output consistent database instance comprising duplicate records, merging duplicate records in the second set in dependence on the functional dependencies of the records to provide a modified database instance.

15 Claims, 4 Drawing Sheets

(56) References Cited

OTHER PUBLICATIONS

Beskales, G. et al., Modeling and Querying Possible Repairs in Duplicate Detection, Aug. 2009, XP002680770, Retrieved from the Internet: URL:http://www.cs.uwaterloo.ca/ -gbeskale/BeskalesVLDB2009.pdf.

Beskales, G. et al., "Sampling the Repairs of Functional Dependency Violations under Hard Constraints", Sep. 2010, XP002680771, Retrieved from the Internet: URL:http://www.cs.uwaterloo.ca/ -gbeskale/Beskales VLDB2010.pdf.

International Search Report in GB1114744.4, dated Nov. 24, 2011.

International Search Report and Written Opinion in International Application PCT/EP2012/060026, dated Aug. 3, 2012.

Kaewbuadee, Kollayut et al., "Data Cleaning Using FD From Data Mining Process"; May 16, 2006. XP007920865. Retrieved from the Internet: URL:http://www.iadis.org/Multi2006/Papers/16jF026 DS.pdf [retrieved on Jul. 24, 2012].

\* cited by examiner

DATABASE RECORD REPAIR

The present invention relates to database record repair.

BACKGROUND

A database is a collection of information arranged in an organized manner. A typical database might include medical, financial or accounting information, demographics and market survey data, bibliographic or archival data, personnel and organizational information, public governmental records, private business or customer data such as addresses and phone numbers, etc.

Such information is usually contained in computer files arranged in a pre-selected database format, and the data contents within them can be maintained for convenient access on magnetic media, both for storage and for updating the file contents as needed.

Poor data quality can have undesirable implications for the effectiveness of a business or other organization or entity. For example, in healthcare, where incorrect information about patients in an Electronic Health Record (EHR) may lead to wrong treatments and prescriptions, ensuring the accuracy of database entries is of prime importance.

A large variety of computational procedures for cleaning or repairing erroneous or duplicate entries in databases have been proposed. Typically, such procedures can automatically or semi-automatically identify errors and, when possible, correct them. Typically, however, these approaches have several limitations relating to the introduction of new database errors as a result of changes that have been made. For example, a repair in order correct a functional dependency problem may lead to duplication errors. Similarly, deduplication can lead to functional dependency violations within a database.

SUMMARY

According to an aspect of the present invention, there is provided a computer implemented method for repairing records of a database, comprising determining a first set of records of the database which violate a functional dependency of the database, modifying records in the first set to make them consistent with the functional dependency to provide an output consistent database instance, determining a second set of records of the output consistent database instance comprising duplicate records, merging duplicate records in the second set in dependence on the functional dependencies of the records to provide a modified database instance. Duplicate records can be determined using a duplication mechanism to group duplicate records into respective clusters, wherein records within respective ones of the clusters represent the same entity. In an example, a duplicate identification attribute is assigned to records in the second set of records, and a schema for the database can include the duplicate identification attribute. Preferably, the modified database instance does not include the duplicate identification attribute.

According to an aspect of the present invention, there is provided a computer implemented method for generating a set of updates for a database including multiple records, the method comprising performing a functional-dependency-aware deduplication of records of the database.

According to an aspect of the present invention, there is provided a computer program embedded on a non-transitory tangible computer readable storage medium, the computer program including machine readable instructions that, when executed by a processor, implement a method for updating a database comprising determining a first set of records of the database which violate a functional dependency of the database, modifying records in the first set to make them consistent with the functional dependency to provide an output consistent database instance, determining a second set of records of the output consistent database instance comprising duplicate records, merging duplicate records in the second set in dependence on the functional dependencies of the records to provide a modified database instance.

Duplicate records can be determined using a duplication mechanism to group duplicate records into respective clusters, wherein records within respective ones of the clusters represent the same entity. A duplicate identification attribute can be assigned to records in the second set of records. In an example, a schema for the database includes the duplicate identification attribute. Preferably, the modified database instance does not include the duplicate identification attribute.

According to an aspect of the present invention, there is provided a computer program embedded on a non-transitory tangible computer readable storage medium, the computer program including machine readable instructions that, when executed by a processor, implement a method for updating a database comprising performing a functional-dependency-aware deduplication of records of the database.

According to an aspect of the present invention, there is provided an apparatus for modifying records in a database, comprising a functional definition detection engine operable to detect functional definition violations for records in the database to provide a first set of records, a functional definition repair engine operable to repair functional definition violations of records in the first set to provide a consistent database instance, a duplicate detection engine operable to detect duplicate record entries in the consistent database instance, and a consistency aware repair engine operable to merge duplicate records in respective clusters of duplicate records of the consistent database instance to provide a modified database instance. The functional definition repair engine can be further operable to repair functional definition violations arising as a result of a previous functional definition repair operation.

DETAILED DESCRIPTION

According to an example, there is provided a method for repairing records of a database that can be inconsistent, incorrect or missing due to duplication and inconsistencies with respect to integrity constraints of the database. Accordingly, deduplication can be performed, which determines and merges duplicate records, as well as the repairing of functional dependency (FD) violations.

Deduplication utilises a measure of similarity or closeness between records in a database to determine candidacy for duplicates. FD repair utilises the notion that the minimal amount of changes to make a database consistent are more likely to be correct. However, when the two tasks are applied one after the other (e.g., deduplication and then data repair), it is atypical for the resultant database to be consistent and free of duplicates because, after FD repair, records can change and new duplicate records may emerge. Further, after deduplication and the merging of duplicates, violations to constraints may emerge in the database. The interaction between the two problems is illustrated in FIG. 1 which is a schematic representation of a small database instance.

Figure 1:
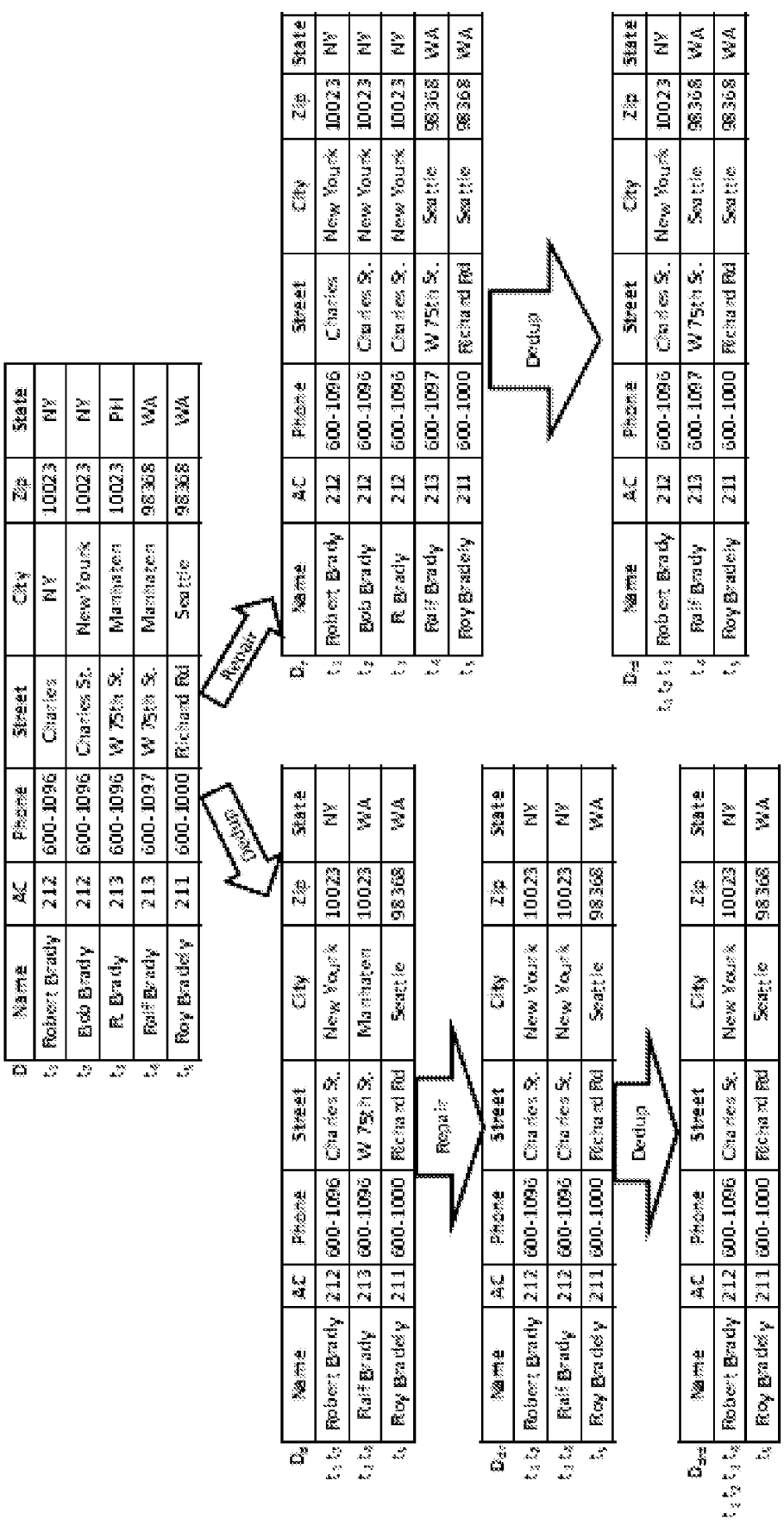
FIG. 1 is a schematic representation of a small database instance.

The database of FIG. 1 includes records that relate personal information of certain people. That is, the database attributes are: Name, telephone information: area code (AC) and Phone; address information: Street, City, State and Zip. In connection with the example of FIG. 1, there are defined a set of functional dependency constraints, $F_1$, $F_2$ and $F_3$:

a. $F_1$: City, Phone→AC, Street, Zip, State
b. $F_2$: Zip→City, State
c. $F_3$: Street, City→Zip The initial instance of the database of figure is D, which contains violations with respect to the specified FDs. For example, records $t_2$ and $t_3$ violate $F_2$ since they agree on the Zip attribute, but do not agree on the City and State attributes. Similarly, $t_3$ and $t_4$ violate $F_4$. Also note that D contains duplicate records. For example, $t_1$ and $t_2$ are candidates to be duplicates due to the similarities between their attributes values.

In order to repair the database instance D, a deduplication operation could be applied. In this case, instance $D_d$ would be obtained. The deduplication considers that $\{t_1, t_2\}$ and $\{t_3, t_4\}$ are two clusters of duplicate records due to the similarity between the attributes values, while $\{t_5\}$ remains in a cluster by itself. The instance $D_d$ is arrived at by merging each cluster of duplicates.

After a deduplication step, $D_d$ is inconsistent with respect to the FDs, since the two resulting records from the merge of $\{t_1, t_2\}$ and $\{t_3, t_4\}$ violate $F_2$. Therefore, the violations now need to be repaired. Violations with respect to $F_2$ can be resolved by making the affected records agree on City and State attributes, which in turn triggers another violation to $F_1$ to be resolved by making the records $\{t_1, t_2\}$ and $\{t_3, t_4\}$ agree on the AC and Street attributes. Finally, the instance $D_{dr}$ (D after applying deduplication followed by an FD repair) is obtained. Applying a deduplication operation to instance $D_{dr}$ reveals that the records $\{t_1, t_2\}$ and $\{t_3, t_4\}$ are duplicates after the repair, and they should be merged to finally obtain the instance $D_{drd}$.

Returning back to the original instance D and assuming that constraints violations are repaired first, one possible repair is shown in instance $D_r$. Note that in $D_r$, records $\{t_1, t_2, t_3\}$ are more likely to be duplicates due to the similarity of their attributes values, and both $t_4$ and $t_5$ appear to be distinct records. By merging the records of $\{t_1, t_2, t_3\}$ instance $D_{rd}$ is obtained. The example of FIG. 1 therefore shows that deduplication may cause violation of database constraints and that the repair of constraints violations may cause new candidate duplicates to appear in a database instance.

The illustrated interaction between the two problems indicates that deduplication and merging records should be aware of the constraints and consistency of the database, while repairing FD inconsistency should be aware of the identified duplicates. As illustrated in the example of FIG. 1, the sequence of applying FD repair and deduplication affects the final database instance obtained. The space of possible clean instances is exponential because of the number of possibilities for repairing FD violations and the number of ways to merge duplicate records. According to an example, there is provided a method for generating a set of updates for a database that seeks a clean instance with minimum distance from the original database instance. In an example, a clean instance of a database is free from FD violations and unwanted duplicate records.

In an example, a database instance D over a relation schema R is considered, with attr(R) denoting its set of attributes. The domain of an attribute $A \in attr(R)$ is denoted by dom(A). A set of constraints 1 is defined over R in the form of a set of FDs, and t[A] denotes the value of a given attribute $A \in attr(R)$ in a database record t. An FD has the form of X→Y, where $X \subset attr(R)$ (left hand side, LHS) and $Y \subset attr(R)$ (right hand side, RHS) are subsets of the attributes attr(R). An instance D satisfies an FD, F:X→Y if, for every pair of records $t_1, t_2 \in D$ $t_1[X]=t_2[X]$, then $t_1[Y]=t_2[Y]$. A database instance D is said to satisfy the constraints $\Sigma$ if it satisfies every FD $F \in \Sigma$.

In an example, FD violations can be resolved as follows. Given $t_1, t_2$ that violate FD X→Y (or $t_1, t_2 | \neq F$) because $t_1[X]=t_2[X]$ but $t_1[Y]=t_2[Y]$, either modify $t_1[Y]$ such that $t_1[Y]=t_2[Y]$ or change the values of $t_1[X]$ such that $t_1[X] \neq t_2[X]$. For example, in instance D of FIG. 1, $\{t_1, t_2\}$ violate $F_2$. To resolve this violation, a modification can be performed so that $t_1[City]$ is changed to 'New York' or $t_2[Zip]$ is changed to a value which is not equal to '10023'.

In an example, respective clusters of candidate duplicate records can be merged (or fused) into a single record using a merging function using any one of several techniques that have been proposed to detect duplicate records. Typically, the merging of duplicate records will result in a record that is close to all the records within the cluster in question. Accordingly, a deduplication mechanism Dup operates to partition a database instance D into a set of clusters Dup(D)=$\{C_1, C_2, \ldots, C_m\}$ such that $D = \cup$. A merger M of a cluster C of duplicate records picks a value $v_A$ for each attribute such that $t[A]=v_A$ for all $t \in C$. For example, in the instance D of FIG. 1, $t_1$ and $t_2$ may be in a cluster of duplicates. In the instance $D_d$, a single record replacement for the two records is constructed from $\{t_1, t_2\}$. In an example, a deduplication mechanism can be any suitable deduplication mechanism suitable for determining candidate duplicate entries for records of a database.

According to an example, a link between deduplication and FD repair occurs in that both define equivalence between attribute values. For a cluster of duplicate records, all their attributes values should typically be equivalent. That is, for an attribute $A \in attr(R)$, t[A] should be the same for all $t \in C$, where C is a cluster of duplicates. On the other hand, consider an FD F:X→Y. If there is a group of records S where t[X] are the same for all t→S, then t[Y] should be equivalent and have the same value for all t→S.

Equivalence due to deduplication is conditioned based on decisions obtained from a deduplication mechanism, Dup, which depends on the attribute values of records. Equivalence due to FDs is conditioned based on the equality of the LHS attribute values. Such equivalence can be represented in an equivalence relation that involves complex dependencies.

According to an example, a method for repairing a database provides a modified database instance D' such that:
1. |S'|≤|D|;
2. D' satisfies the constraints $\Sigma$
3. |Dup(D')|=|D'|; and
4. D' is produced by introducing minimal changes to D That is, in terms of item 3, applying the deduplication mechanism Dup on D does not detect new duplicates. A data cleaning process to get D' from D requires a sequence of value modification operations and the replacement of duplicates with a single record. According to an example, the cost of a cleaning process to repair a database in order to arrive at a modified instance can be defined as:

$$\text{Cost}(D, D') = \sum_{\forall t \in D, M(t)=t' \in D', A \in attr(R)} dist_A(t[A], t'[A])$$

where M(t) maps t∈D to the record t'∈D', which is the corresponding record for t after merge and repair operations. Note that merging a cluster of duplicate records has the cost of modifying all the records values to the same value.

The function $dist_A(t[A], t'[A])$ is a distance function for the domain values of attribute A that, in an example, returns a score between 0 and 1, where 0 signifies an exact match. Examples of distance functions include the Edit distance and Jaro for string attributes; and the normalized distance for numerical attributes. That is, given two numbers $\{a, b\} \in dom(A)$, $dist_A(a, b) = (|a-b|)/(max(A)-min(A))$, where max(A) and min(A) are the maximum and minimum values in dom (A), respectively. Other alternatives are possible as will be appreciated.

According to an example, an FD repair is determined by performing a minimal amount of changes to a database instance in order to make it consistent or clean, thereby resulting in a modified database instance. In terms of merging a cluster of duplicate records, a single record is determined which is used as a replacement for the corresponding cluster of records. Typically, the record that is close to all the records within the cluster is the selected one. Implicitly, this can be interpreted as finding the minimal amount of changes to attributes' values to make the records within a cluster identical. Accordingly, given a database D, a duplication mechanism Dup and a set of constraints Σ, a method according to an example determines a modified database instance D' for which the cost associated with arriving at the modification, Cost(D, D'), is a minimum.

Figure 2:
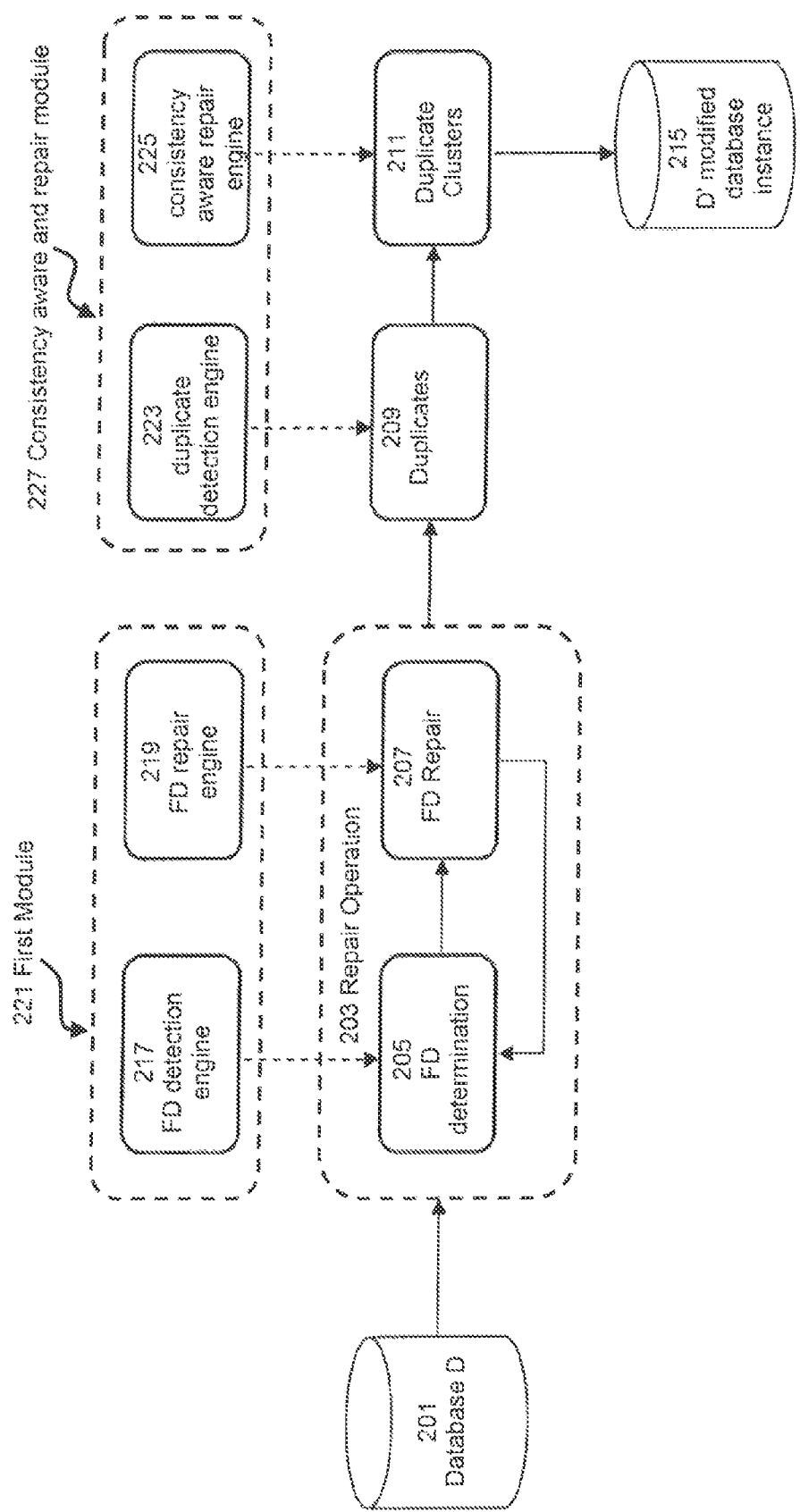
FIG. 2 is a schematic block diagram of a method according to an example.

FIG. 2 is a schematic block diagram of a method according to an example. A database 201 can be a database D as described above. That is, database 201 includes a relation schema R for example and a number of records which violate certain functional definitions for the database and which includes a number of duplicate records, which can be duplicates where attribute values match or are similar, where a measure of similarity can be determined using a distance function for example.

According to an example, a database 201 can be initially repaired such that it is consistent with respect to a set of given FDs. Accordingly, in block 203 a repair operation can be performed on database 201. That is, records which violate one or more functional dependencies are determined in block 205, and the determined records are repaired in block 207. Since the repair in block 207 may give rise to further violations of functional dependencies, the process can be repeated until no functional definition violations are present.

The output consistent database instance can then be used in the process of identifying duplicate records to be merged in block 209. A merger can result in a new record that is composed of a combination of attributes values of the original records that are being merged. Therefore, a simple merge for the duplicate records may introduce violations to the given FDs. Accordingly, a consistency aware merger (CAM) of a set of records can be used in the example. The main purpose is to produce a consistent database while making all identified clusters of duplicates identical, such that the final repaired database instance can be constructed, such as by using a "select distinct" SQL statement for example.

A database instance D', which is arrived at as a result of a CAM to an instance D, is defined in an example as a database in which:
all records in D are moved to D'
D' satisfies the constraints Σ, and
for each cluster of duplicates C∈Dup(D), C's records appear identical in D'

According to an example, the requirements for D' are further qualified such that, given a database D, a duplication mechanism Dup and a set of constraints Σ, a cost associated with arriving at a modified database instance D', Cost(D, D'), is minimised.

If the database D is consistent (after repairing the FD violations), then, according to an example, a record t from each cluster C is selected and t'=t∀t'∈C. That is, the records of C are made identical to the selected record t. The output of the merger is thus consistent with respect to the given FDs.

The selected record, which is used to represent the cluster may not be the best representation for the entity. Typically, the record that is close to all the records within the clusters is a good representation, and moreover, it will encounter the least amount of changes to the cluster of records to make them identical.

According to an example, identified duplicates can be considered as additional constraints to be considered as well as Σ when repairing a database. Since deduplication identifies equivalence between attributes' values for a given cluster of duplicates, similarly, the FD defines equivalence between the RHS attributes conditioned on the equality on the LHS attributes. Accordingly, a consistency aware merger can be encoded into a single FD repair problem by defining identified duplicates as an additional FD constraint, such that, in order to arrive at a modified database instance, a method can include the steps:
1. Construct a new instance D" with the new relation R" such that:
2. R" is the same as R after addition a new attribute D_id.
3. For each cluster of duplicate records C, set t[D_id]=i in D".
4. Consider the new set of constraints Σ"=Σ∪{FD:D_id→attr (R)}.

A method according to an example finds an FD repair for D" without changing the attribute D_id. Then, for the constraints Σ" the duplicate records are determined while maintaining D"|=Σ in block 211. The modified database instance D" is determined by dropping the attribute D_id from the modified instance.

The first step to repair the FD violations in a repair-first data cleaning process is not informed by or dependent on the existence of duplicates however. The initial FD repair will find minimal changes to make the data consistent—however, if informed by the existence of duplicates, FD repair can help improve the accuracy of the identified clusters of duplicate records.

In an example, functional dependency violation identification in block 205 can be performed using an FD detection engine 217. The repair of records exhibiting functional dependency violations in block 207 can be performed using an FD repair engine 219. Engines 217, 219 can form a first module 221 for detecting and repairing FD violations using one of the techniques described above.

Identification of duplicate records in block 209 can be performed using a duplicate detection engine 223 which can execute the Dup function described above. Repair of a database instance in which duplicates are clustered, in block 211, can be performed using a consistency aware repair engine 225. Engines 223, 225 can form a consistency aware detection and repair module 227. The end result is a modified database instance 215 in which functional dependency violations and duplicates are repaired.

Figure 3:
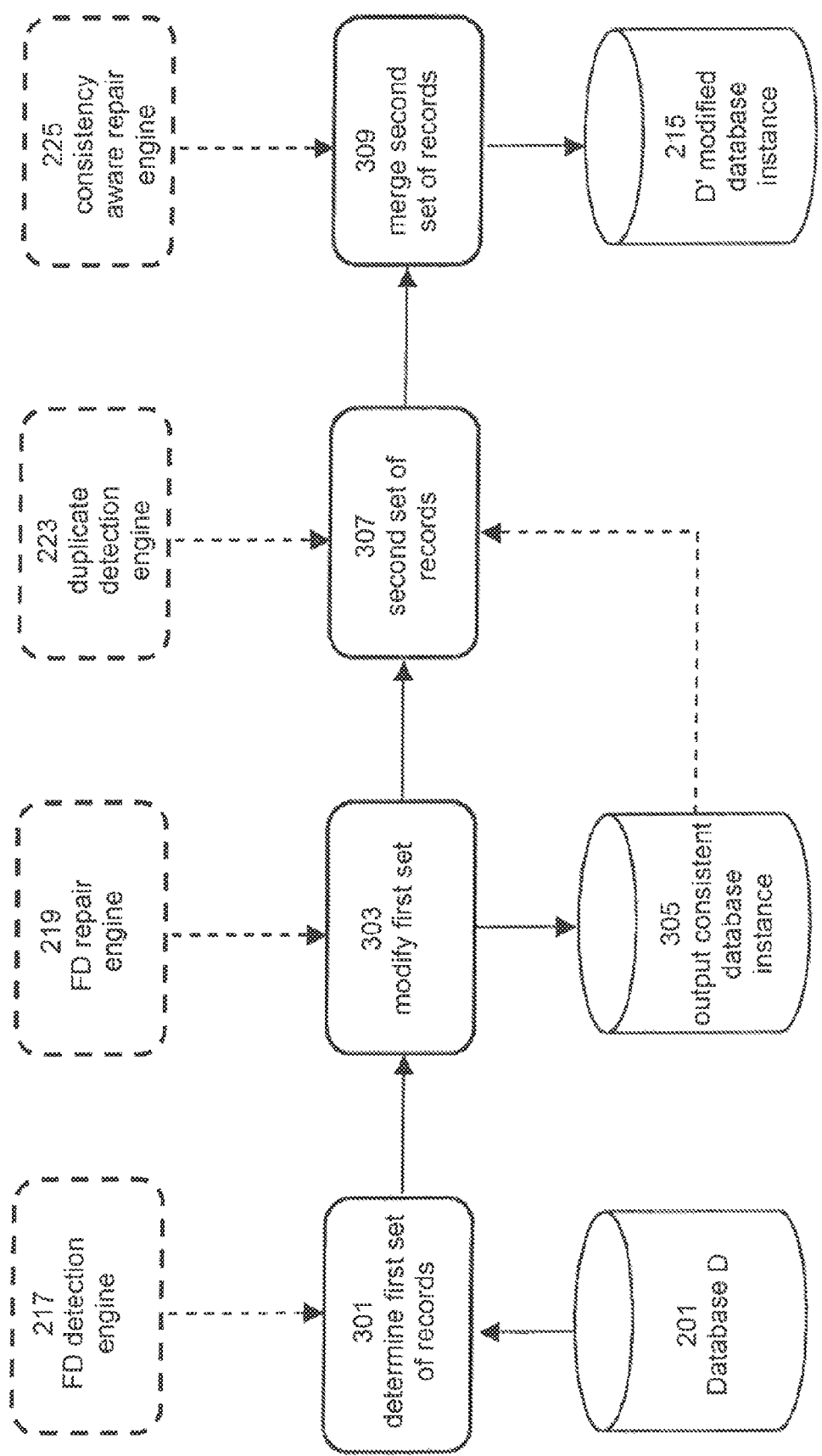
FIG. 3 is a flowchart of a method according to an example.

FIG. 3 is a flowchart of a method according to an example. A database 201 includes multiple records which can include records which are duplicates and/or which violate one or more functional dependencies of the database as described above. In block 301 a first set of records of the database which violate a functional dependency are determined using engine 217 for example. In block 303 the records in the first set are modified in order to make them consistent with the functional dependency and to provide an output consistent database instance 305, such as by using engine 219 for example. In an example, the repair of records can proceed according to the techniques described above. In block 307 a second set of records of the output consistent database instance comprising duplicate records is determined, for example, using the Dup function described above which can be executed using engine 223 for example. In block 309 duplicate records in the second set are merged in dependence on the functional dependencies of the records to provide a modified database instance 215 using engine 225 for example.

Figure 4:
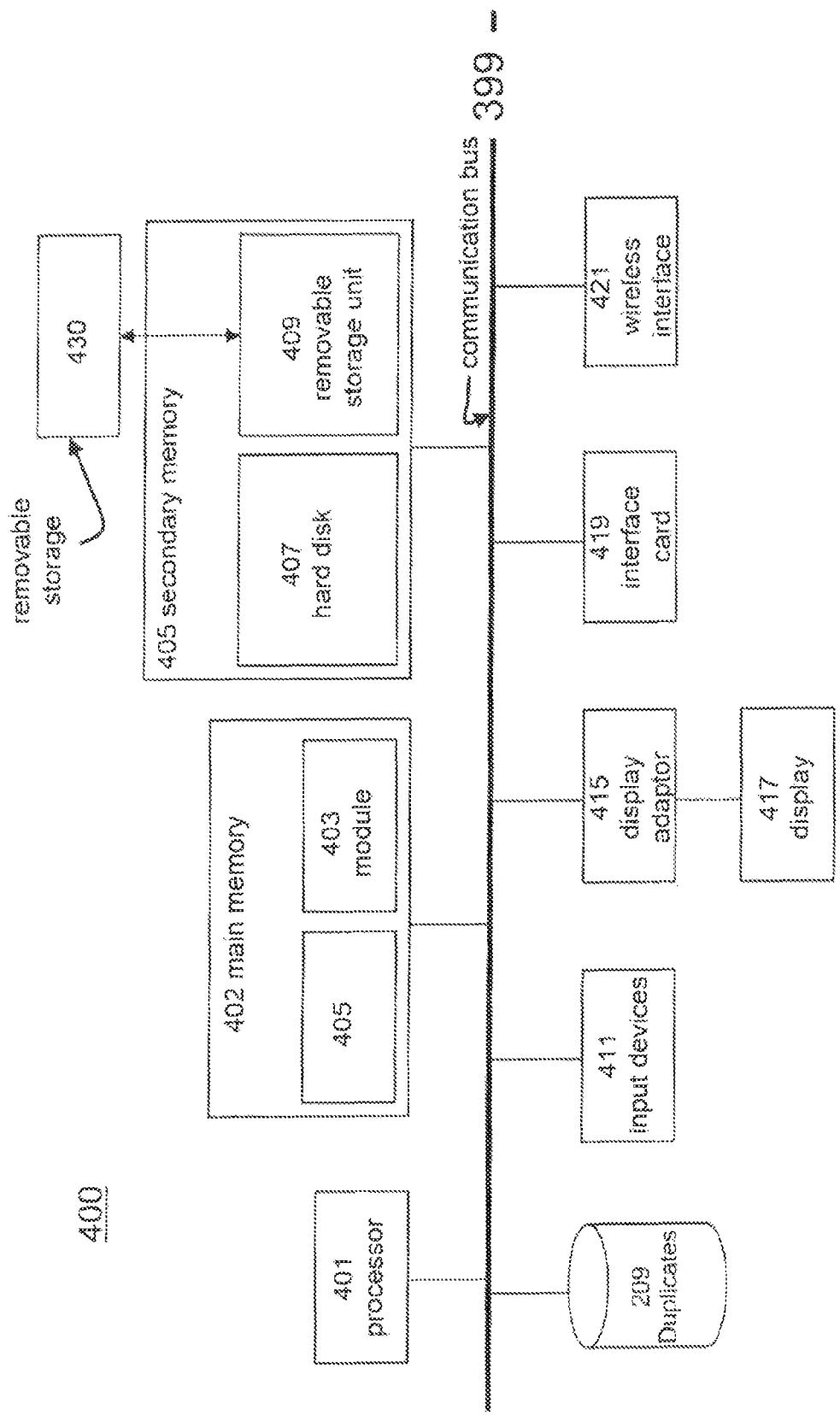
FIG. 4 is a schematic block diagram of an apparatus according to an example.

FIG. 4 is a schematic block diagram of an apparatus according to an example suitable for implementing any of the system or processes described above. Apparatus 400 includes one or more processors, such as processor 401, providing an execution platform for executing machine readable instructions such as software. Commands and data from the processor 401 are communicated over a communication bus 399. The system 400 also includes a main memory 402, such as a Random Access Memory (RAM), where machine readable instructions may reside during runtime, and a secondary memory 405. The secondary memory 405 includes, for example, a hard disk drive 407 and/or a removable storage drive 430, representing a floppy diskette drive, a magnetic tape drive, a compact disk drive, etc., or a nonvolatile memory where a copy of the machine readable instructions or software may be stored. The secondary memory 405 may also include ROM (read only memory), EPROM (erasable, programmable ROM), EEPROM (electrically erasable, programmable ROM). In addition to software, data representing any one or more of updates, possible updates or candidate replacement entries, and listings for identified tuples may be stored in the main memory 402 and/or the secondary memory 405. The removable storage drive 430 reads from and/or writes to a removable storage unit 409 in a well-known manner.

A user interfaces with the system 400 with one or more input devices 411, such as a keyboard, a mouse, a stylus, and the like in order to provide user input data. The display adaptor 415 interfaces with the communication bus 399 and the display 417 and receives display data from the processor 401 and converts the display data into display commands for the display 417. A network interface 419 is provided for communicating with other systems and devices via a network (not shown). The system can include a wireless interface 421 for communicating with wireless devices in the wireless community.

It will be apparent to one of ordinary skill in the art that one or more of the components of the system 400 may not be included and/or other components may be added as is known in the art. The system 400 shown in FIG. 4 is provided as an example of a possible platform that may be used, and other types of platforms may be used as is known in the art. One or more of the steps described above may be implemented as instructions embedded on a computer readable medium and executed on the system 400. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

A database 209 is shown in FIG. 4 as a standalone database connected to bus 399. However, it can be a database which can be queried and have data written to it from a remote location using the wired or wireless network connections mentioned above. Alternatively, database 209 may be stored in memory 405, such as on a HDD of system 400 for example.

Any one or more of the engines in modules 221, 227 of FIG. 2 can be implemented in memory 402 as modules 403, 405 for example.

What is claimed is:

1. A computer implemented method for repairing records of a database, comprising:
   determining a first set of records of the database which violate a functional dependency of the database;
   modifying records in the first set to make them consistent with the functional dependency to provide an output consistent database instance;
   determining a second set of records of the output consistent database instance comprising duplicate records;
   merging duplicate records of the second set in dependence on the functional dependencies of the first set of records to provide a modified database instance, wherein the merging is a consistency aware merger encoded into a single functional dependency repair problem by defining identified duplicate records as additional functional dependency constraints encoded into the single functional dependency repair problem.

2. A method as claimed in claim 1, further comprising determining duplicate records using a duplication mechanism to group duplicate records into respective clusters, wherein records within respective ones of the clusters represent the same entity.

3. A method as claimed in claim 1, further comprising assigning a duplicate identification attribute to records in the second set of records.

4. A method as claimed in claim 1, further comprising assigning a duplicate identification attribute to records in the second set of records, wherein a schema for the database includes the duplicate identification attribute.

5. A method as claimed in claim 1, further comprising assigning a duplicate identification attribute to records in the second set of records, wherein the modified database instance does not include the duplicate identification attribute.

6. A computer implemented method for generating a set of updates for a database including multiple records, the method comprising:
   performing a functional-dependency-aware deduplication of records of the database.

7. A computer program embedded on a non-transitory tangible computer readable storage medium, the computer program including machine readable instructions that, when executed by a processor, implement a method for updating a database comprising:
   determining a first set of records of the database which violate a functional dependency of the database;
   modifying records in the first set to make them consistent with the functional dependency to provide an output consistent database instance;
   determining a second set of records of the output consistent database instance comprising duplicate records; and
   merging duplicate records of the second set in dependence on the functional dependencies of the first set of records to provide a modified database instance, wherein the merging is a consistency aware merger encoded into a single functional dependency repair problem by defining identified duplicate records as additional functional dependency constraints encoded into the single functional dependency repair problem.

8. The computer program embedded on a non-transitory tangible computer readable storage medium as claimed in claim 7, further comprising instructions that, when executed by the processor, implement a method for updating a database further comprising:
   determining duplicate records using a duplication mechanism to group duplicate records into respective clusters, wherein records within respective ones of the clusters represent the same entity.

9. The computer program embedded on a non-transitory tangible computer readable storage medium as claimed in claim 7, further comprising instructions that, when executed by the processor, implement a method for updating a database further comprising assigning a duplicate identification attribute to records in the second set of records.

10. The computer program embedded on a non-transitory tangible computer readable storage medium as claimed in claim 7, further comprising instructions that, when executed by the processor, implement a method for updating a database further comprising assigning a duplicate identification attribute to records in the second set of records, and instructions that, when executed by the processor, implement a method for updating a database, wherein a schema for the database includes the duplicate identification attribute.

11. The computer program embedded on a non-transitory tangible computer readable storage medium as claimed in claim 7, further comprising instructions that, when executed by the processor, implement a method for updating a database further comprising assigning a duplicate identification attribute to records in the second set of records, and instructions that, when executed by the processor, implement a method for updating a database, wherein the modified database instance does not include the duplicate identification attribute.

12. A computer program embedded on a non-transitory tangible computer readable storage medium, the computer program including machine readable instructions that, when executed by a processor, implement a method for updating a database comprising performing a functional-dependency-aware deduplication of records of the database.

13. Apparatus for modifying records in a database, comprising:
   a communication bus;
   a processor connected to and communicating data across the communication bus, the processor being configured to execute machine readable instructions stored in at least one memory; the at least one memory having:
      a functional definition detection engine operable to detect functional definition violations for records in the database to provide a first set of records;
      a functional definition repair engine operable to repair functional definition violations of records in the first set to provide a consistent database instance;
      a duplicate detection engine operable to detect duplicate record entries in the consistent database instance; and
      a consistency aware repair engine operable to merge duplicate records in respective clusters of duplicate records of the consistent database instance to provide a modified database instance, wherein the merging is a consistency aware merger encoded into a single functional dependency repair problem by defining identified duplicate records as an additional functional dependency constraints; and
   a user interface communicating with the processor via the communication bus.

14. Apparatus as claimed in claim 13, wherein the functional definition repair engine is further operable to repair functional definition violations arising as a result of a previous functional definition repair operation.

15. A method as claimed in claim 1 wherein the consistency aware merger compares attribute values in the output consistency database instance and equivalence values of the second set of records to minimise a cost.

* * * * *